US011290694B1

(12) United States Patent
Hajati (10) Patent No.: US 11,290,694 B1
(45) Date of Patent: Mar. 29, 2022

(54) IMAGE PROJECTOR WITH HIGH DYNAMIC RANGE

(71) Applicant: APPLE INC., Cupertino, CA (US)

(72) Inventor: Arman Hajati, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/134,569

(22) Filed: Dec. 28, 2020

Related U.S. Application Data (60) Provisional application No. 62/986,803, filed on Mar. 9, 2020.

(51) Int. Cl.
*H04N 9/31* (2006.01)

(52) U.S. Cl.
CPC ......... *H04N 9/3126* (2013.01); *H04N 9/3155* (2013.01)

(58) Field of Classification Search
CPC .... H04N 9/312; H04N 9/3111; H04N 9/3126; H04N 9/3135; H04N 9/3138; H04N 9/3155; H04N 9/3161; H04N 9/3164; H04N 9/3197; G03B 21/008; G03B 21/28; G03B 21/58; G03B 21/208; G03B 21/2013; G03B 21/2033; G03B 21/2053; G02B 27/01; G02B 27/0101; G02B 27/0179; G02B 27/104; G02B 27/127; G02B 27/145; G02B 27/283
See application file for complete search history.

(56) References Cited

U.S. PATENT DOCUMENTS

| | | | |
|---|---|---|---|
| 8,237,760 B2 | 8/2012 | Nihei et al. | |
| 8,976,363 B2 | 3/2015 | Bendall et al. | |
| 9,025,253 B2 | 5/2015 | Hadad et al. | |
| 9,297,996 B2 | 3/2016 | Bohn et al. | |
| 9,329,080 B2 | 5/2016 | Shpunt et al. | |
| 10,003,168 B1 * | 6/2018 | Villeneuve | G02B 27/10 |
| 10,488,746 B2 | 11/2019 | Pertierra et al. | |

(Continued)

FOREIGN PATENT DOCUMENTS

EP 3550329 A1 10/2019

OTHER PUBLICATIONS

Hajati et al., U.S. Appl. No. 16/871,069, filed May 11, 2020.

(Continued)

*Primary Examiner* — Sultan Chowdhury
(74) *Attorney, Agent, or Firm* — Kligler & Associates Patent Attorneys Ltd (57) ABSTRACT

Optical scanning apparatus includes an emitter array, including a semiconductor substrate and a plurality of optical emitters, which are configured to emit respective beams of optical radiation and which are arranged on the semiconductor substrate in an array of rows and columns, the columns having mutually-parallel column axes. A scanner is configured to intercept and deflect the emitted beams at respective angles that vary about a scan axis that is parallel to the column axes. Control circuitry is configured to select the optical emitters that are to be actuated to emit the respective beams in each of a succession of time slots and to drive the scanner in synchronization with the time slots to deflect the emitted beams at an angular scan rate selected so as to cause the beams emitted from successive columns of the array to impinge on an image plane in succession along a common line.

20 Claims, 4 Drawing Sheets

(56) References Cited

U.S. PATENT DOCUMENTS

| | | | |
|---|---|---|---|
| 2003/0011751 A1* | 1/2003 | Sakata | H04N 9/3129 |
| | | | 353/30 |
| 2006/0221022 A1* | 10/2006 | Hajjar | G09G 3/02 |
| | | | 345/84 |
| 2007/0153866 A1 | 7/2007 | Shchegrov et al. | |
| 2007/0159673 A1 | 7/2007 | Freeman et al. | |
| 2014/0146394 A1 | 5/2014 | Tout et al. | |
| 2017/0176596 A1 | 6/2017 | Shpunt et al. | |
| 2018/0081168 A1 | 3/2018 | Shpunt et al. | |
| 2018/0120559 A1 | 5/2018 | Yeoh et al. | |
| 2019/0094981 A1 | 3/2019 | Bradski et al. | |
| 2019/0227319 A1 | 7/2019 | Trail et al. | |
| 2019/0348585 A1 | 11/2019 | Woodgate et al. | |
| 2019/0369405 A1* | 12/2019 | Chen | F21V 5/04 |
| 2020/0348418 A1* | 11/2020 | Sutton | G01S 7/4817 |

OTHER PUBLICATIONS

Hajati et al., U.S. Appl. No. 16/871,068, filed May 11, 2020.
Hajati et al., U.S. Appl. No. 16/871,063, filed May 11, 2020.
U.S. Appl. No. 16/871,068 Office Action dated May 13, 2021.

\* cited by examiner

IMAGE PROJECTOR WITH HIGH DYNAMIC RANGE

CROSS-REFERENCE TO RELATED APPLICATION

This application claims the benefit of U.S. Provisional Patent Application 62/986,803, filed Mar. 9, 2020, which is incorporated herein by reference.

FIELD OF THE INVENTION

The present invention relates generally to optoelectronic systems, and particularly to methods and devices for image projection.

BACKGROUND

Image projection devices are used to project electronically generated images either onto a screen or directly into the eye of an observer. Systems of this sort can project an image to be viewed by an observer in, for example, game or educational applications. In some systems, the image is combined with a real scene seen through a screen in applications such as, for example, surgery or complicated mechanical assembly.

SUMMARY

Embodiments of the present invention that are described hereinbelow provide improved optoelectronic apparatus and methods.

There is therefore provided, in accordance with an embodiment of the invention, optical scanning apparatus, including an emitter array, which includes a semiconductor substrate and a plurality of optical emitters, which are configured to emit respective beams of optical radiation and which are arranged on the semiconductor substrate in an array of rows and columns, the columns having mutually-parallel column axes. A scanner is configured to intercept and deflect the emitted beams at respective angles that vary about a scan axis that is parallel to the column axes. Control circuitry is configured to select the optical emitters that are to be actuated to emit the respective beams in each of a succession of time slots and to drive the scanner in synchronization with the time slots to deflect the emitted beams at an angular scan rate selected so as to cause the beams emitted from successive columns of the array to impinge on an image plane in succession along a common line.

In a disclosed embodiment, the optical emitters include vertical-cavity surface-emitting lasers (VCSELs). Alternatively or additionally, the optical emitters include light-emitting diodes (LEDs). In a disclosed embodiment, the scanner includes a rotating mirror, and the scan axis includes an axis of rotation of the rotating mirror.

In some embodiments, the control circuitry is configured to actuate the optical emitters and drive the scanner so that the beams emitted from the columns of the array impinge on the image plane along a series of mutually-parallel common lines over the succession of the time slots. In a disclosed embodiment, the control circuitry is configured to actuate the optical emitters so that the mutually-parallel common lines define raster lines of an image that is projected onto the image plane, while the rows of the emitters define pixels in the raster lines.

In some of these embodiments, each of the pixels has a respective intensity, and the control circuitry is configured to select a number of the optical emitters to actuate in each row for deflection of the respective beams onto each of the common lines responsively to the respective intensity of a pixel corresponding to the row in each of the common lines. In one such embodiment, the control circuitry is further configured to modulate an emission of at least one of the optical emitters in each row responsively to the respective intensity of the corresponding pixel. In a disclosed embodiment, the control circuitry is configured to receive a digital value of the respective intensity of each pixel in the image, the digital value including most significant bits and least significant bits, and to set the number of the optical emitters to actuate responsively to the most significant bits, while adjusting a modulation of the at least one of the optical emitters responsively to the least significant bits. Additionally or alternatively, the control circuitry is configured to modulate the emission by applying a constant-current time-domain modulation to the at least one of the optical emitters.

There is also provided, in accordance with an embodiment of the invention, a method for optical scanning, which includes providing a plurality of optical emitters, which are configured to emit respective beams of optical radiation and which are arranged in an array of rows and columns, the columns having mutually-parallel column axes. A scanner is positioned to intercept and deflect the emitted beams at respective angles that vary about a scan axis that is parallel to the column axes. The optical emitters that are to be actuated to emit the respective beams in each of a succession of time slots are selected while driving the scanner in synchronization with the time slots to deflect the emitted beams at an angular scan rate selected so as to cause the beams emitted from successive columns of the array to impinge on an image plane in succession along a common line.

The present invention will be more fully understood from the following detailed description of the embodiments thereof, taken together with the drawings in which:

DETAILED DESCRIPTION OF EMBODIMENTS

Some image projectors use a one-dimensional (1D) image generating assembly to generate successive lines in an image, while a scanner, such as a scanning mirror, directs the lines along the appropriate angles to form a raster image at the image plane. (In some applications, the real image plane may be on the retina of the observer, corresponding to a virtual image plane in the observer's field of vision.) When the image lines are generated and scanned at a sufficient speed, for example at 30 frames/sec or faster, the observer will perceive the sequence of 1D line images as a single, continuous image.

For example, U.S. patent application Ser. No. 16/871,069, filed May 11, 2020, describes a compact and efficient image projector based on combining a 1D image generating assembly with a scanning mirror and a pupil expander. The image generating assembly projects a sequence of line images extending in a first direction, for example the vertical direction in eyeglasses on which the projector is mounted. A scanning mirror receives and reflects the line images while rotating about a mirror axis parallel to the first direction (a vertical axis in the present example). The scanning mirror reflects the line images through the edge of a pupil expander, which directs multiple, parallel replicas of the expanded line images simultaneously through the face of the pupil expander toward the eye of the person wearing the eyeglasses.

Each such 1D line image thus corresponds to a single raster line (along a vertical direction in the above example) within a two-dimensional (2D) image that is projected through the face of the pupil expander. The pixels of the line image are modulated in synchronization with the rotation of the mirror to generate successive lines of the 2D image, which are then projected by the beam expander at different, respective angles. Control circuitry drives the image generating assembly to produce the 1D line images in synchronization with the scanning mirror based on the image content that is to be displayed, with each full scan of the mirror corresponding to a successive image frame.

For versatile operation in a variety of environments and applications, scanning image projectors of the sort described above (in common with other sorts of compact projectors) are generally required to generate images with high resolution and high brightness. In some applications, high dynamic range is also needed, meaning that pixel intensities can vary by at least eight bits (corresponding to a dynamic range of 255:1), or even as much as twelve bits. When such projectors are integrated into eyeglasses, the image generating assembly should also be compact and power-efficient.

Embodiments of the present invention that are described herein address these conflicting needs using a novel two-dimensional array of optical emitters, together with a scanner, which scans the emitted beams in synchronization with actuation of the emitters. Specifically, the scanner is synchronized to deflect the beams emitted, in rapid sequence, by multiple emitters in any given row of the array so that all the beams impinge on the same pixel location in the image plane. The intensity of each pixel in the image is controlled by varying the number of emitters that are actuated to direct their beams onto the pixel location. This sort of array and actuation scheme can be used, among other applications, in place of the image generating assembly in the above-mentioned U.S. patent application Ser. No. 16/871,069, to generate brighter line images with enhanced dynamic range. The present scheme is also useful in reducing speckle (when the emitters comprise lasers), as well as other artifacts and non-uniformities in the projected image.

For example, in one embodiment, fifteen emitters in each row of the array may be switched on or off to generate the four most significant bits (MSB) of the digital intensity value of each pixel. One or more additional emitters in the row may be modulated (for example by applying a constant-current time-domain modulation scheme, such as pulse width modulation) to add the least significant bits (LSB). Larger or smaller numbers of emitters may be used to generate a larger or smaller dynamic range, depending on application requirements.

Thus, in the embodiments described below, optical scanning apparatus comprises an array of optical emitters arranged on a semiconductor substrate in multiple rows and columns. A scanner, such as a rotating mirror, intercepts and deflects the beams emitted by the optical emitters at respective angles that vary about a scan axis that is parallel to the axes of the columns of the array. (In other words, each beam is deflected in a plane that is perpendicular to the scan axis—which in the case of a rotating mirror corresponds to the axis of rotation of the mirror—at an angle that varies within the plane during the scan.) Control circuitry selects the optical emitters that are to be actuated to emit respective beams in each of a succession of time slots. The control circuitry drives the scanner in synchronization with the time slots to deflect the emitted beams at an angular scan rate that is selected so as to cause the beams emitted from successive columns of the array to impinge in succession along a common line on the image plane.

Thus, as explained above, the beams emitted from multiple emitters in each row of the array will impinge in succession on the same point, i.e., at the same pixel in a raster line of the image. By proper synchronization of the scan with emitter actuation, the apparatus projects multiple, mutually-parallel lines of the image concurrently in this fashion, and thus draws all the lines of a raster image in the course of each scan cycle of the scanner. Typically, the rates of beam emission and scanning are high enough so that the pixels of the image appear to the observer to be illuminated continuously, despite being made up of sequences of discrete beam pulses.

Figure 1:
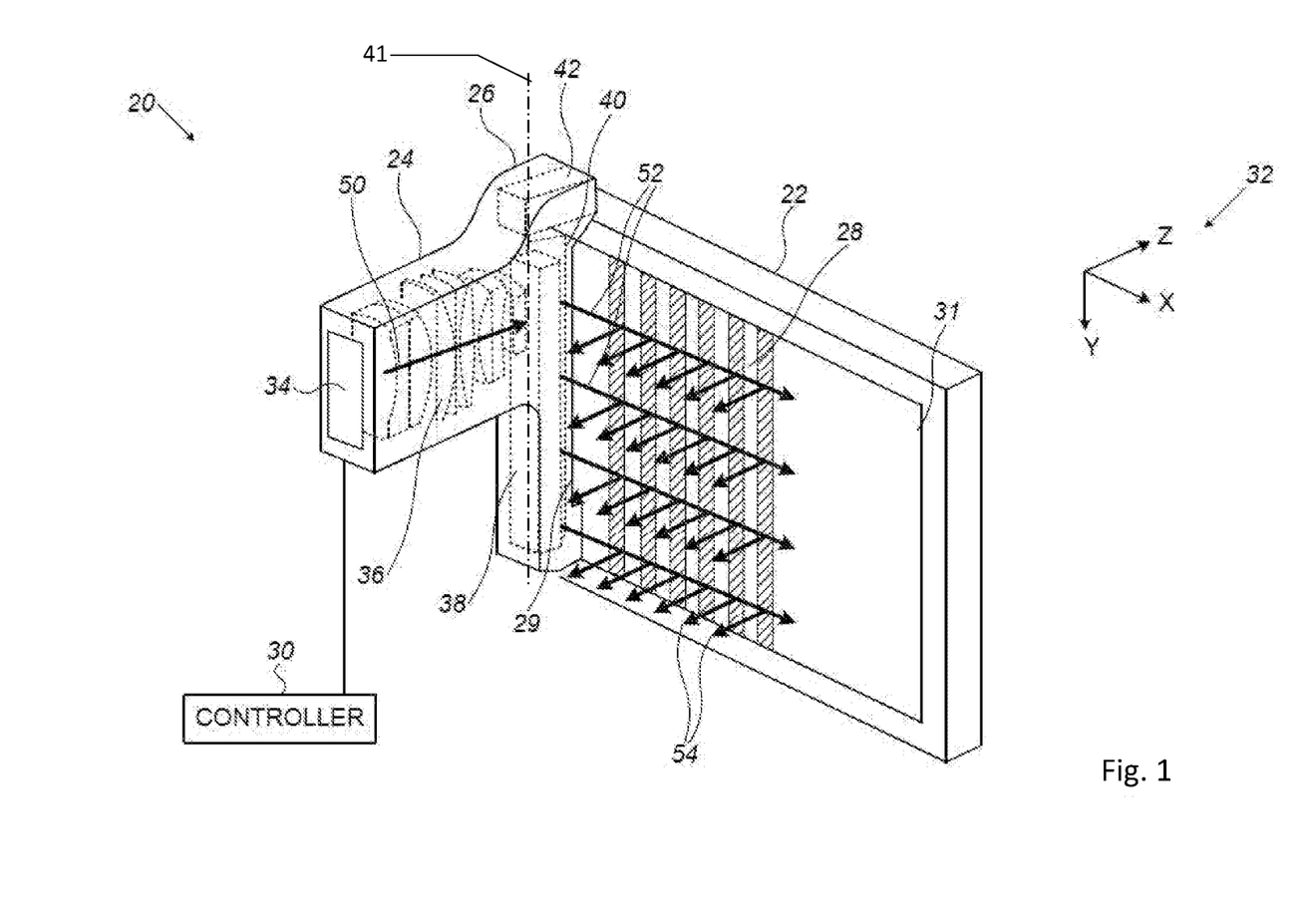
FIG. 1 is a schematic pictorial illustration of an image projection apparatus, in accordance with an embodiment of the invention.

FIG. 1 is a schematic pictorial illustration of an image projection apparatus 20, in accordance with an embodiment of the invention. Apparatus 20 may be used, for example, as part of a retinal projection system, as well as in other image projection applications. Apparatus 20 is based on a typical format of eyeglasses. For the sake of simplicity, only the left side of apparatus 20 (as referenced to an observer wearing the eyeglasses) is shown. Apparatus 20 comprises a suitably modified eyeglass frame 22, a 1D image generating assembly 24, a scanning mirror assembly 26, and a 1D pupil expander 28. A controller 30 is coupled to image generating assembly 24 and to scanning mirror assembly 26. Controller 30 is a part of the control circuitry of apparatus 20, together with other switching, selection, and modulation components that are described below.

Image generating assembly 24 comprises an emitter array 34, which is shown and described in detail hereinbelow with reference to FIG. 3. Emitter array 34 comprises, for example, a matrix of vertical-cavity surface-emitting lasers (VCSELs) or micro-light-emitting diodes (micro-LEDs). Collimation optics 36 collimate the beams of optical radiation that are emitted from emitter array 34 toward a 1D beam expander 38, which vertically expands the image created by the emitter array. Beam expander 38 and pupil expander 28 are shown here by way of illustration, but their functions are outside the scope of the present description. These components are described further in the above-mentioned U.S. patent application Ser. No. 16/871,069. For the sake of simplicity, only a single, uniform emitter array 34 is shown in the figures; but when apparatus 20 is to project color images, image generating assembly may comprise emitters of multiple, different colors or multiple emitter arrays, each emitting a different color, along with suitable beam-combining optics (not shown).

Scanning mirror assembly 26 comprises an elongated rectangular scanning mirror 40 and a mirror actuator 42, such as a galvanometer. An axis 41 of rotation of the scanning mirror assembly is parallel to the Y-axis of a Cartesian coordinate system 32, corresponding to the vertical axis of the eyeglasses. (Cartesian coordinate system 32 is used for the sake of clarity and convenience only. Similarly the terms "vertical" and "horizontal" refer arbitrarily to the directions of the Y- and X-axes, but have no functional significance in the present context.) The typical range of scan frequencies of scanning mirror assembly 26 is 30 Hz or higher, so that the image produced by a full angular scan is seen by an observer as one image. Alternatively, scanning mirror assembly 26 may comprise a long rotating polygon with an electric motor drive or may be replaced by a suitable scanner of another type.

Figure 2:
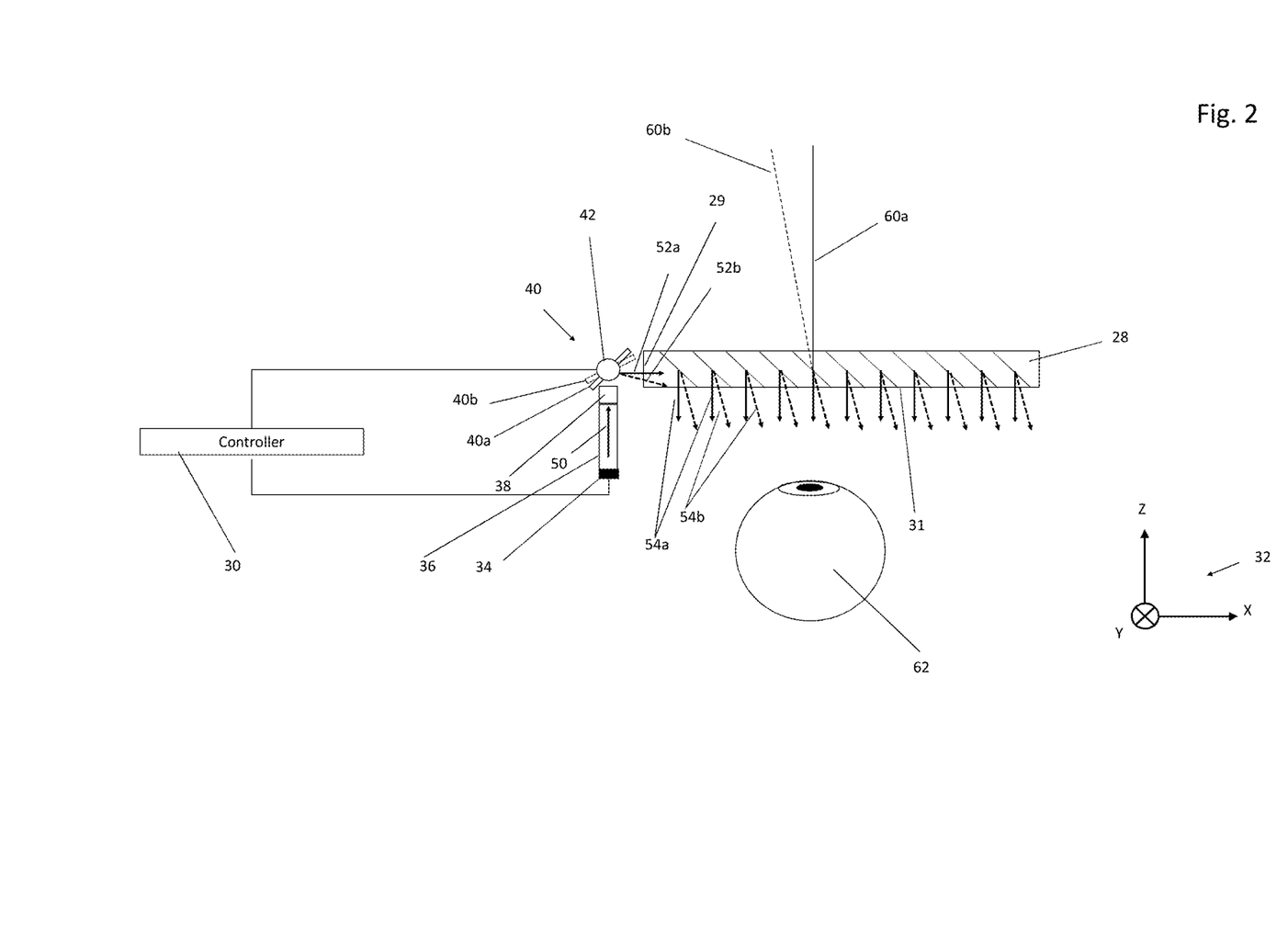
FIG. 2 is a schematic top view of the apparatus of FIG. 1, in accordance with an embodiment of the invention.

FIG. 2 is a schematic top view of apparatus 20, in accordance with an embodiment of the invention. FIGS. 1 and 2 show the flow of optical signals from emitter array 34 to their exit from pupil expander 28. Emitter array 34 emits a 2D array of beams, which are collimated by collimation optics 36 toward beam expander 38, as indicated by an arrow 50. The expanded 2D image produced by beam expander 38 is reflected by mirror 40 over a range of angles toward the X-direction. Controller 30 synchronizes the rotation of mirror 40 with the emission from successive columns of emitters in array 34 so that the rotation of the mirror directs the 2D array of beams into a series of mutually-parallel common lines, which enter pupil expander 28 through an edge 29, as indicated by arrows 52a and 52b. Pupil expander 28 expands the received beams into multiple, parallel replicas arrayed across the X-direction and projects them through a face 31 (oriented in the X-Y-plane) of the pupil expander toward an eye 62 of an observer, as shown by arrows 54a and 54b.

Scanning mirror 40 is shown in FIG. 2 in two angular orientations labelled 40a and 40b, wherein orientation 40a is shown by a solid line and orientation 40b is shown by a dotted line. When scanning mirror 40 is in the vicinity of orientation 40a, it reflects and projects the collimated and expanded beams from array 34 into a series of lines (oriented along the Y-direction) in a general direction shown by arrow 52a into pupil expander 28 through its edge 29. Pupil expander 28, in turn, expands the image in the X-direction and emits this line image through face 31, as shown by solid arrows 54a. A solid line 60a, parallel to arrows 54a, indicates the direction where eye 62, placed behind pupil expander 28 in system 20, would perceive an image corresponding to the line image reflected by scanning mirror 40 in orientation 40a. Thus, a given angular orientation of scanning mirror 40 corresponds to a given apparent direction of a series of 1D line images, where the observer can see a distant and resolvable object.

Similar considerations apply when scanning mirror 40 is oriented in the vicinity of orientation 40b: The collimated, expanded, and reflected beams along the series of lines are now projected into pupil expander 28 along arrow 52b, and are converted into a series of 1D line image directed along arrows 54b. A line 60b indicates the direction in which an image would now be seen by eye 62.

Lines 60a and 60b correspond to raster lines of a 2D image. Each raster line comprises respective pixels generated by the emitters in array 34, extending along the Y-direction. As noted above, each pixel is illuminated by the superposed beams of one or more of the emitters in a given row of array 34. Multiple lines of this sort, distributed across the X-direction, make up the 2D image. Thus, by driving emitter array 34 and mirror actuator 42 in synchronization, control circuitry 30 causes apparatus 20 to generate and display a full 2D image (i.e., an image with a 2D extent in the angular domain). The scanning frequency of scanning mirror assembly 26 is typically sufficiently high so that the full angular extent in X-direction is seen as a single image by the human observer.

Figure 3:
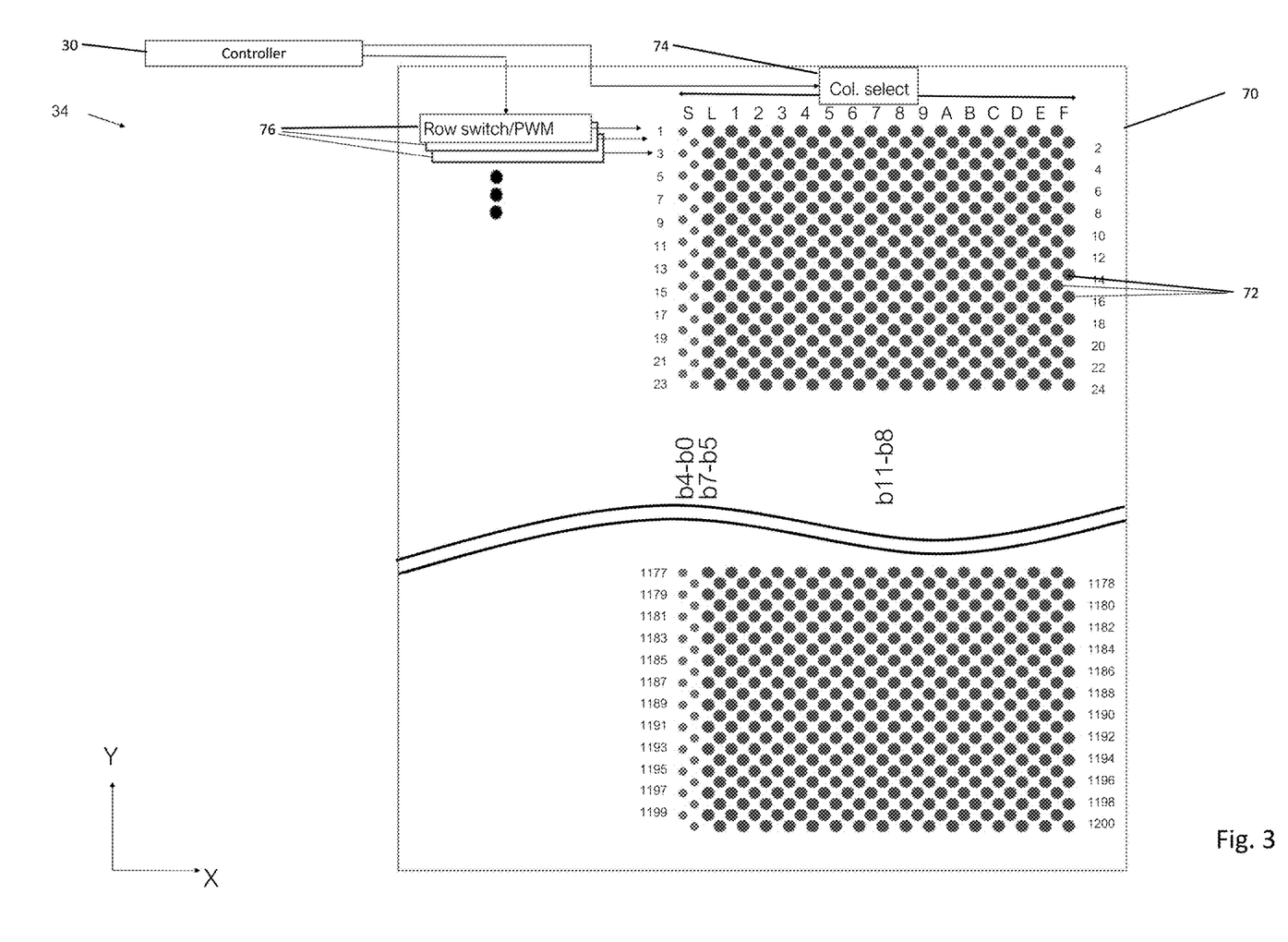
FIG. 3 is a schematic frontal view of an emitter array, in accordance with an embodiment of the invention.

FIG. 3 is a schematic frontal view of emitter array 34, in accordance with an embodiment of the invention. Emitter array 34 comprises a semiconductor substrate 70, such as a silicon or GaAs wafer chip, on which an array of optical emitters 72 is disposed. In the present example, emitters 72 are assumed to comprise VCSELs or LEDs, which are formed on substrate 70 by processes of epitaxial deposition and photolithographic etching, as are known in the art. Alternatively array 34 may comprise solid-state emitters of other types.

Emitters 72 are arranged on semiconductor substrate 70 in an array comprising rows and columns. In the pictured example, array 34 comprises 1200 rows (labeled 1-1200), having respective row axes running along the X-direction, and seventeen pairs of columns, having respective column axes running along the Y-direction, parallel to the rotational axis of mirror 40 (as shown in FIGS. 1-2). The columns are offset in the even rows relative to the odd rows to enable denser packing of emitters 72 in the array. The columns are labeled S, L and 1-F (in hexadecimal notation), for reasons that are explained below. These array dimensions and notations, however, are shown here solely by way of example, and array 34 may alternatively have larger or smaller numbers of rows and columns (with or without offsets between successive columns), depending on application requirements. Furthermore, the terms "rows" and "columns" are used solely for the sake of convenience to denote the arrangement of emitters 72 in array 34 and may be interchanged arbitrarily.

Emitters 72 are actuated to emit light in a succession of time slots by applying pulses of electrical current to array 34. Controller 30 selects the emitters that are to be actuated (switched on) during each time slot, based on the intensities of the pixels in an image frame that is to be projected by image generating assembly 24 (FIG. 1). To enable such selection, each emitter 72 in columns 1-F is actuated by a respective binary current switch, such as a transistor (not shown), on substrate 70, which turns the emitter on or off for each time slot. The current supplied to emitters 72 in columns S and L, on the other hand, can be modulated, for example by a pulse-width modulation (PWM) circuit on substrate 70, to enable finer control of the optical flux that is output by these emitters in each pixel. It is advantageous for this reason that columns S and L be located at the edge of array 34, so that the modulation circuits can be located conveniently on substrate 70 outside the emitting area.

Prior to each time slot, controller 30 outputs a respective control word for each row to row logic 76, indicating which of the emitters 72 in columns 1-F are to be turned on in this row, as well as indicating the PWM duty cycle value for the emitters in columns S and L. Controller 30 drives column selection logic 74 together with row logic 76 to set the current switches in accordance with the corresponding bits of the control words.

(Controller 30, column selection logic 74 and row logic 76, together with mirror actuator 42, make up the control circuitry of image generating assembly 24.) The current pulse will then actuate the emitters that are switched on in columns 1-F to emit optical radiation during the time slot, while the emitters in columns S and L emit optical radiation with a modulated intensity level. At the end of each current pulse, controller 30 repeats the process of setting the current switches and PWM values for the next time slot.

Controller 30 drives the scan of mirror 40 in synchronization with the time slots in which array 70 is actuated, so that the mirror deflects the beams output by emitters 72 at an angular scan rate selected so as to cause the beams emitted from successive columns of the array to impinge in successive time slots along a common line in the image plane of apparatus 20. In the pictured geometry, the duration of the time slots and the rotational speed of mirror 40 are selected so that the rotational angle traversed by the mirror during a single time slot is equal to half the angular spacing between the beams emitted from successive columns of array 34 following collimation by optics 36. As a result, all of the beams emitted successively from the columns of array 34 over a succession of time slots equal in number to the number of columns in the array will be deflected by mirror 40 so as to superimpose on respective points in the image plane that extend along a single line in the Y-direction.

In each successive time slot, mirror 40 deflects the beams from any given column in array 34 to shift in the X-direction by an amount equal to the angular spacing between the successive columns. Thus, over a succession of time slots, the beams emitted from the columns of array 34 will impinge on the image plane in succession along a series of mutually-parallel common lines (extending along the Y-direction in the frame of reference that is shown in FIGS. 1 and 2). These mutually-parallel common lines define raster lines of an image that is projected onto the image plane, while each row of emitters 72 defines a corresponding pixel in each of the raster lines. The number of raster lines in the image is determined by the number of successive time slots occurring in a single scan of mirror 40 across the area of the image.

Assuming the intensity of each pixel in the image to be represented by a digital value, controller 30 uses the MSB of the digital value in order to select the number of emitters 72 in the corresponding row of array 70 that are to be actuated during the successive time slots in which the beams from the emitters impinge on the pixel. Thus, in the example shown in FIG. 3, controller 30 is able to set the four MSB of the intensity of each pixel to any value between zero (0000) and fifteen (1111) by actuating between zero and fifteen of the emitters in columns 1-F of array 34 in the appropriate, successive time slots.

Controller 30 uses the LSB of the digital value in order to adjust the modulation of the emitters in columns L and S. For example, assuming that row logic 76 applies PWM to modulate the emission, controller 30 will set PWM duty value cycles of the emitters according to the LSB values. In particular, assuming the digital intensity values to be 12-bit numbers (meaning that the emitters in columns 1-F generating bits 8-11), emitters 72 in column S may be modulated among thirty-two PWM duty cycle values to generate the five lowest LSB (bits 0-4), while the emitters in column L are modulated among eight duty cycle values to generate the next three LSB (bits 5-7). (In each case, the lowest duty cycle value is zero.) In this scheme, the emitters in column L may be of the same type as the emitters in columns 1-F, while the emitters in column S have a maximum brightness that is one-eighth of the brightness of the emitters in the other columns. For this purpose, for example, the emitters in column S may be driven at a lower current or voltage than the other emitters, or they may be of a different type, with smaller dimensions or a different optical arrangement that reduces their brightness.

As a specific example, assuming image generating assembly 24 to project images at 120 frames/sec, with a resolution of 1200×1200 pixels and 75% projection duty cycle (leaving time for fly-back of mirror 40 between frames), controller 30 will actuate emitters 72 in successive time slots of 5.2 µs. The temporal resolution required for PWM of the emitters in column L will then be 0.75 µs, while column S will require resolution of 0.167 µs. These values are well within the limits of existing CMOS control circuits. Assembly 24 thus achieves much higher brightness and higher dynamic range than image projectors that use a single emitter per pixel, while operating with relaxed timing requirements relative to comparable single-emitter projection schemes.

In any case, the arrangement of array 34 that is shown in FIG. 3 and the allocation of bits that is described above are presented solely by way of example. The principles of the present invention may readily be extended to arrays and image generating assemblies that support larger or smaller numbers of bits of intensity per pixel, with different numbers of emitters per row, different allocations of the MSB and LSB, and different numbers of pixels with binary actuation or modulated actuation. In alternative embodiments, all the emitters in array 70 may simply be actuated on or off, as in columns 1-F in the example shown in FIG. 3; or all the emitters may be subject to PWM or other beam modulation. All such embodiments are considered to be within the scope of the present invention.

Figure 4:
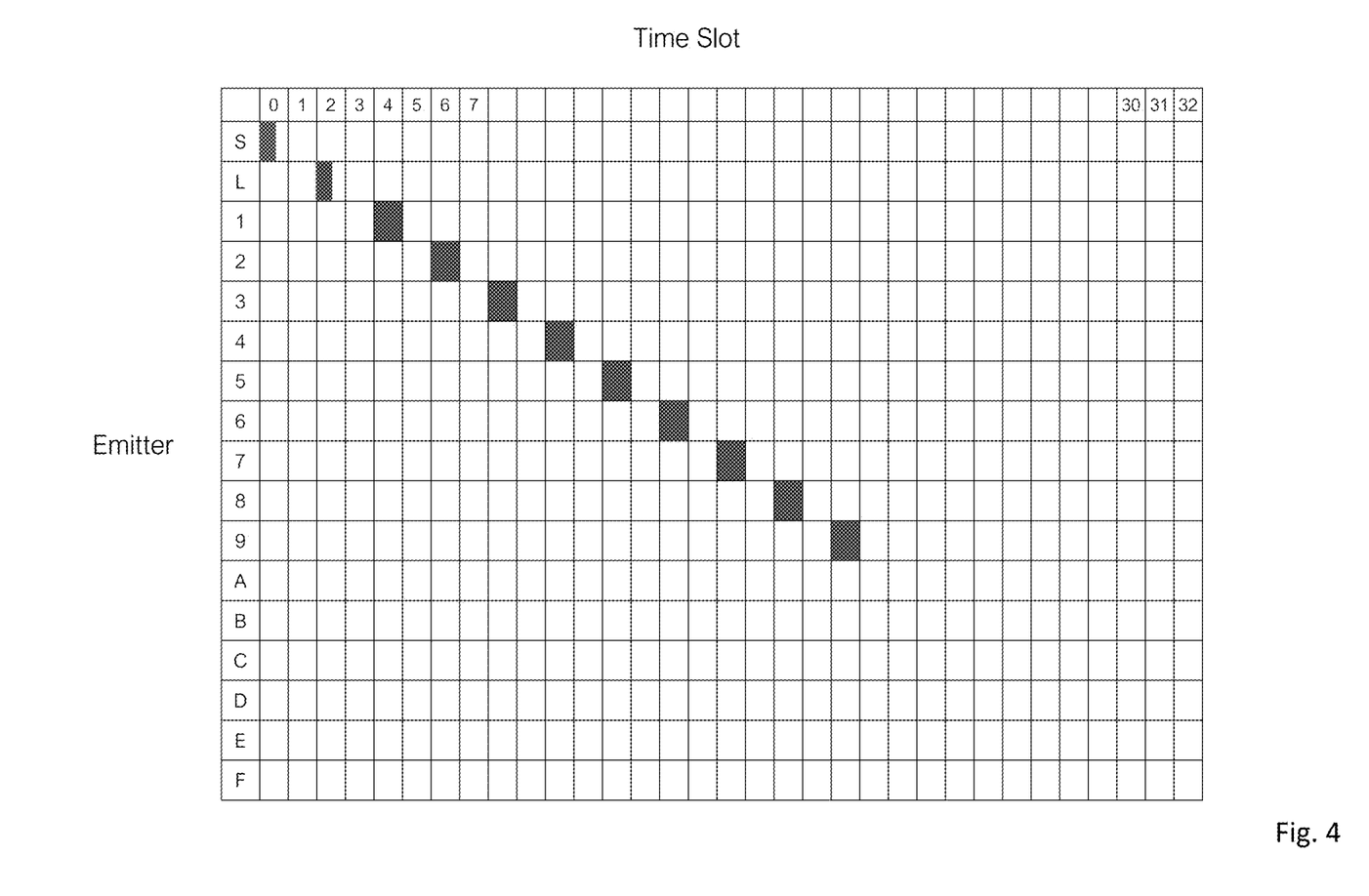
FIG. 4 is a plot that schematically illustrates a timing scheme applied in generating a pixel in a projected image, in accordance with an embodiment of the invention.

FIG. 4 is a plot that schematically illustrates a timing scheme applied by controller 30 in generating a single pixel in an image projected by apparatus 20, in accordance with an embodiment of the invention. The horizontal axis shows successive time slots, while the vertical axis indicates the emitters in a row of array 70. The locations of the shaded blocks in the plot indicate the emitters that are actuated in succession to generate the particular pixel in question. (In subsequent time slots, different emitters in this row will be actuated in succession to generate the corresponding pixels in subsequent raster lines.)

In the pictured example, the pixel has a digital intensity value of 2453, corresponding to the binary value 100110010101. Emitters 72 are actuated as follows to generate this value:

The emitters in columns 1-9 are actuated to generate the value of the four MSB: 1001.

Emitter L is actuated with a duty cycle of 57% (4/7) to generate the next three bits: 100.

Emitter S (with peak brightness one-eighth of that in the other columns) is actuated with a duty cycle of 68% (21/31) to generate the five LSB: 10101.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical scanning apparatus, comprising:
   an emitter array, comprising:
      a semiconductor substrate; and
      a plurality of optical emitters, which are configured to emit respective beams of optical radiation and which are arranged on the semiconductor substrate in an array of rows and columns, the columns having mutually-parallel column axes;
   a scanner, which is configured to intercept and deflect the emitted beams at respective angles that vary about a scan axis that is parallel to the column axes; and
   control circuitry, which is configured to select the optical emitters that are to be actuated to emit the respective beams in each of a succession of time slots and to drive the scanner in synchronization with the time slots to deflect the emitted beams at an angular scan rate selected such that over each successive time slot, the beams shift by an amount equal to an angular spacing between the columns of the array, so as to cause the beams emitted from successive columns of the array to impinge on an image plane in succession along a common line.

2. The optical scanning apparatus according to claim 1, wherein the optical emitters comprise vertical-cavity surface-emitting lasers (VCSELs).

3. The optical scanning apparatus according to claim 1, wherein the optical emitters comprise light-emitting diodes (LEDs).

4. The optical scanning apparatus according to claim 1, wherein the scanner comprises a rotating mirror, and wherein the scan axis comprises an axis of rotation of the rotating mirror.

5. The optical scanning apparatus according to claim 1, wherein the control circuitry is configured to actuate the optical emitters and drive the scanner so that the beams emitted from the columns of the array impinge on the image plane along a series of mutually-parallel common lines over the succession of the time slots.

6. The optical scanning apparatus according to claim 5, wherein the control circuitry is configured to actuate the optical emitters so that the mutually-parallel common lines define raster lines of an image that is projected onto the image plane, while the rows of the emitters define pixels in the raster lines.

7. The optical scanning apparatus according to claim 6, wherein each of the pixels has a respective intensity, and wherein the control circuitry is configured to select a number of the optical emitters to actuate in each row for deflection of the respective beams onto each of the common lines responsively to the respective intensity of a pixel corresponding to the row in each of the common lines.

8. The optical scanning apparatus according to claim 7, wherein the control circuitry is further configured to modulate an emission of at least one of the optical emitters in each row responsively to the respective intensity of the corresponding pixel.

9. The optical scanning apparatus according to claim 8, wherein the control circuitry is configured to receive a digital value of the respective intensity of each pixel in the image, the digital value comprising most significant bits and least significant bits, and to set the number of the optical emitters to actuate responsively to the most significant bits, while adjusting a modulation of the at least one of the optical emitters responsively to the least significant bits.

10. The optical scanning apparatus according to claim 8, wherein the control circuitry is configured to modulate the emission by applying a constant-current time-domain modulation to the at least one of the optical emitters.

11. A method for optical scanning, comprising:
providing a plurality of optical emitters, which are configured to emit respective beams of optical radiation and which are arranged in an array of rows and columns, the columns having mutually-parallel column axes;
positioning a scanner to intercept and deflect the emitted beams at respective angles that vary about a scan axis that is parallel to the column axes; and
selecting the optical emitters that are to be actuated to emit the respective beams in each of a succession of time slots while driving the scanner in synchronization with the time slots to deflect the emitted beams at an angular scan rate selected such that over each successive time slot, the beams shift by an amount equal to an angular spacing between the columns of the array, so as to cause the beams emitted from successive columns of the array to impinge on an image plane in succession along a common line.

12. The method according to claim 11, wherein the optical emitters comprise vertical-cavity surface-emitting lasers (VCSELs).

13. The method according to claim 11, wherein the optical emitters comprise light-emitting diodes (LEDs).

14. The method according to claim 11, wherein the scanner comprises a rotating mirror, and wherein the scan axis comprises an axis of rotation of the rotating mirror.

15. The method according to claim 11, wherein selecting the optical emitters comprises actuating the optical emitters while driving the scanner so that the beams emitted from the columns of the array impinge on the image plane along a series of mutually-parallel common lines over the succession of the time slots.

16. The method according to claim 15, wherein the optical emitters are actuated so that the mutually-parallel common lines define raster lines of an image that is projected onto the image plane, while the rows of the emitters define pixels in the raster lines.

17. The method according to claim 16, wherein each of the pixels has a respective intensity, and wherein actuating the optical emitters comprises selecting a number of the optical emitters to actuate in each row for deflection of the respective beams onto each of the common lines responsively to the respective intensity of a pixel corresponding to the row in each of the common lines.

18. The method according to claim 17, and comprising modulating an emission of at least one of the optical emitters in each row responsively to the respective intensity of the corresponding pixel.

19. The method according to claim 18, wherein selecting the number of the optical emitters comprises receiving a digital value of the respective intensity of each pixel in the image, the digital value comprising most significant bits and least significant bits, and setting the number of the optical emitters to actuate responsively to the most significant bits, while modulating the emission comprises adjusting a modulation of the at least one of the optical emitters responsively to the least significant bits.

20. The method according to claim 18, wherein modulating the emission comprises applying a constant-current time-domain modulation to the at least one of the optical emitters.

* * * * *